(12) United States Patent
Yu et al.

(10) Patent No.: US 8,577,159 B2
(45) Date of Patent: Nov. 5, 2013

(54) METHODS AND DEVICES FOR DATA COMPRESSION WITH ADAPTIVE FILTERING IN THE TRANSFORM DOMAIN

(75) Inventors: Xiang Yu, Kitchener (CA); Dake He, Waterloo (CA); En-hui Yang, Petersburg (CA)

(73) Assignee: BlackBerry Limited, Waterloo, Ontario (CA)

( * ) Notice: Subject to any disclaimer, the term of this patent is extended or adjusted under 35 U.S.C. 154(b) by 124 days.

(21) Appl. No.: 13/232,057

(22) Filed: Sep. 14, 2011

(65) Prior Publication Data
US 2012/0063691 A1 Mar. 15, 2012

Related U.S. Application Data

(60) Provisional application No. 61/382,523, filed on Sep. 14, 2010.

(51) Int. Cl.
*H04N 7/50* (2006.01)
(52) U.S. Cl.
USPC ............ 382/232; 382/233; 382/238; 382/248
(58) Field of Classification Search
USPC ......... 382/232, 233, 236, 238, 248, 250, 260, 382/275, 279; 348/398.1, 411.1; 375/240; 379/406.1; 600/437, 443; 704/205, 229
See application file for complete search history.

(56) References Cited

U.S. PATENT DOCUMENTS

| | | | | |
|---|---|---|---|---|
| 5,109,417 A | * | 4/1992 | Fielder et al. | 704/205 |
| 5,142,656 A | * | 8/1992 | Fielder et al. | 704/229 |
| 5,230,038 A | * | 7/1993 | Fielder et al. | 704/229 |
| 5,357,594 A | * | 10/1994 | Fielder | 704/200.1 |
| 5,394,473 A | * | 2/1995 | Davidson | 704/200.1 |
| 5,448,680 A | * | 9/1995 | Kang et al. | 704/225 |
| 5,479,562 A | * | 12/1995 | Fielder et al. | 704/229 |
| 5,526,446 A | * | 6/1996 | Adelson et al. | 382/275 |
| 6,546,099 B2 | * | 4/2003 | Janse | 379/406.01 |
| RE41,445 E | * | 7/2010 | Janse | 379/406.01 |
| 8,306,341 B2 | * | 11/2012 | Odagiri et al. | 382/233 |
| 2006/0013497 A1 | | 1/2006 | Yang et al. | |
| 2007/0217506 A1 | | 9/2007 | Yang et al. | |

FOREIGN PATENT DOCUMENTS

| | | |
|---|---|---|
| CA | 2701758 | 4/2009 |
| CA | 2719232 | 10/2009 |
| CA | 2729904 | 1/2010 |

OTHER PUBLICATIONS

Xiang Yu et al: "Adaptive quantization with balanced distortion distribution and its application to H.264 intra coding" Image Processing (ICIP), 2009 16th IEEE International Conference on, IEEE Piscataway, NJ, USA LNKD DOI:10.1109/ICIP.2009.5413738, Nov. 7, 2009, pp. 1049-1052, XP031628437.

(Continued)

*Primary Examiner* — Anh Do
(74) *Attorney, Agent, or Firm* — Rowand LLP

(57) ABSTRACT

Methods and devices for encoding and decoding data using adaptive transform domain filtering are described. The encoder determines a set of transform domain filter coefficients to be applied to a transform domain prediction. The filtering may, in some cases, also apply to quantized transform domain coefficients. Rate-distortion optimization may be used to determine the optimal filter coefficients on a frame-based, coding-unit-basis, or other basis.

36 Claims, 9 Drawing Sheets

(56) References Cited

OTHER PUBLICATIONS

En-Hui Yang et al: "Soft Decision Quantization for H.264 With Main Profile Compatibility" IEEE Transactions on Circuits and Systems for Video Technology, IEEE Service Center, Piscataway, NJ, US LNKD 001:10.1109/TCSVT.2008.2009260, vol. 19, No. 1, Jan. 1, 2009, pp. 122-127, XP011280553.

En-Hui Yang et al: "Rate Distortion Optimization for H.264 Interframe Coding: A General Framework and Algorithms" IEEE Transactions on Image Processing, IEEE Service Center, Piscataway, NJ, US LNKD-DOI:10.1109/TIP.2007.896685, vol. 16, No. 7, Jul. 1, 2007, pp. 1774-1784, XP011185448.

Matthew Crouse et al:"Joint Thresholding and Quantizer Selection for Transform Image Coding: Entropy-Constrained Analysis and Applications to Baseline JPEG" Transactions on Image Processing, IEEE Service Center, Piscataway, NJ, US, vol. 6, No. 2, Feb. 1, 1997 XP011026108.

Jiangtao Wen et al: "Trellis-Based R-D Optimal Quantization in H.263+" Transactions on Image Processing, IEEE Service Center, Piscataway, NJ, US, vol. 9, No. 8, Aug. 1, 2000, XP011025644.

Extended European Search Report dated Oct. 14, 2010.

ITU-T Recommendation H.264/ISO/IEC 14496-10 AVC, Advanced video coding for general audiovisual services, Nov. 2007.

T.Wiegand and G.J. Sullivan and A. Luthra, ITU-T Rec. H.264/ISO/IEC 14496-10 AVC, Joint Video Team of ISO/IEC MPEG and ITU-T VCEG.

E.H. Yang and X. Yu, On joint optimization of motion compensation, quantization and baseline entropy coding in H.264 with complete decoder compatibility, Proceedings of IEEE International Conference on Acoustics, Speech, and Signal Processing, pp. II325-II328, Mar. 2005.

E.H. Yang and X. Yu, Rate Distortion Optimization of H.264 with Main Profile Compatibility, IEEE International Symposium on Information Theory, pp. 282-286, Jul. 2006.

E.H. Yang and X. Yu, Rate Distortion Optimization for H.264 Interframe Coding: A General Framework and Algorithms, IEEE Trans. On Image Processing, pp. 1774-1784, vol. 16, Jul. 2007.

S. Lloyd, "Least Squares Quantization in PCM", IEEE Trans. on Information Theory, vol. IT-28, No. 2, pp. 129-137, Mar. 1982.

H.S. Malvar, A. Hallapuro, M. Karczewicz, L. Kerofsky, "Low-complexity transform and quantization in H.264/AVC," IEEE Transactions on Circuits and Systems for Video Technology, vol. 13, Issue 7, pp. 598-603, Jul. 2003.

A. Tanizawa, T. Chujoh, "Simulation results of Adaptive Quantization Matrix Selection on KTA software," ITU-SG16/Q6, Document VCEG-AC07, Klagenfurt, Austria, Jul. 17-18, 2006.

I. Amonou et al: "Description of video coding technology proposal by France Telecom, NTT, NTT DoCoMo, Panasonic and Technicolor", JCTVC-A114, Joint Collaborative Team on Video Coding (JCT-VC) of ITU-T SG16 WP3 and ISO/IEC JTC1/SC29/WG11, 1st Meeting: Dresden, DE, Apr. 15-23, 2010.

M. Karczewicz et al: "Video coding technology proposal by Qualcomm Inc.", JCTVC-A121, Joint Collaborative Team on Video Coding (JCT-VC) of ITU-T SG16 WP3 and ISO/IEC JTC1/SC29/WG11, 1st Meeting: Dresden, DE, Apr. 15-23, 2010.

International Searching Authority, Written Opinion and International Search Report relating to application No. PCT/CA2011/050559 dated Dec. 12, 2011.

\* cited by examiner

METHODS AND DEVICES FOR DATA COMPRESSION WITH ADAPTIVE FILTERING IN THE TRANSFORM DOMAIN

CROSS-REFERENCE TO RELATED APPLICATIONS

The present application claims priority to U.S. patent application Ser. No. 61/382,523, filed Sep. 14, 2010, owned in common herewith, and the contents of which are hereby incorporated by reference.

FIELD

The present application generally relates to data compression and, in particular, to methods and devices for adaptive filtering in the DCT domain during data encoding and decoding.

BACKGROUND

Data compression occurs in a number of contexts. It is very commonly used in communications and computer networking to store, transmit, and reproduce information efficiently. It finds particular application in the encoding of images, audio and video. Video presents a significant challenge to data compression because of the large amount of data required for each video frame and the speed with which encoding and decoding often needs to occur. The current state-of-the-art for video encoding is the ITU-T H.264/AVC video coding standard. It defines a number of different profiles for different applications, including the Main profile, Baseline profile and others. A next-generation video encoding standard is currently under development through a joint initiative of MPEG-ITU: High Efficiency Video Coding (HEVC).

There are a number of standards for encoding/decoding images and videos, including H.264, that use block-based coding processes. In these processes, the image or frame is divided into blocks, typically 4×4 or 8×8, and the blocks are spectrally transformed into coefficients, quantized, and entropy encoded. In many cases, the data being transformed is not the actual pixel data, but is residual data following a prediction operation. Predictions can be intra-frame, i.e. block-to-block within the frame/image, or inter-frame, i.e. between frames (also called motion prediction). It is expected that HEVC will also have these features.

When spectrally transforming residual data, many of these standards prescribe the use of a discrete cosine transform (DCT) or some variant thereon. The resulting DCT coefficients are then quantized using a quantizer that employs a uniform quantization step size.

Quantization is lossy. In other words, it introduces distortion that shows up as noise in the reconstructed images or videos. Accordingly, many existing compression schemes utilize some form of post-processing, i.e. filtering, to try to remove quantization noise from reconstructed pixels. Examples include deblocking filters, de-noising filters, or other pixel-domain filters.

Work in lossy compression, e.g., audio/voice coding, video coding, image coding, etc., tends to focus on improving rate-distortion performance. That is, the objective of most encoding and decoding schemes is to find an optimal balance between distortion and coding rate. A rate-distortion optimization expression of the type $J = D + \lambda R$ is typically used, wherein the Lagrangian multiplier $\lambda$ represents the desired trade-off between coding rate and distortion.

It would be advantageous to provide for an improved encoder, decoder and method of encoding or decoding.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
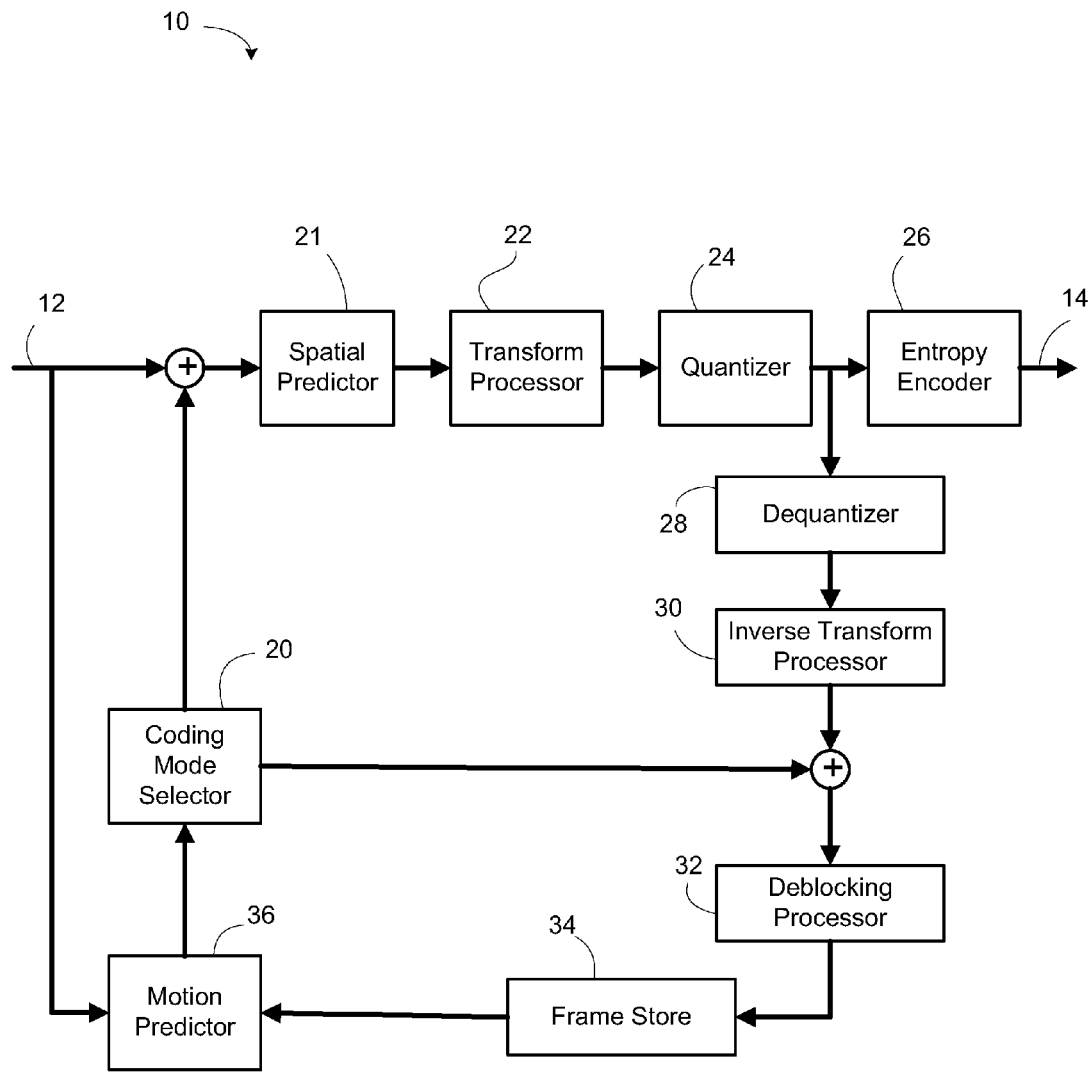
FIG. 1 shows, in block diagram form, an encoder for encoding video.

The present application describes methods and encoders/decoders for achieving rate-distortion improvements in lossy data compression. In some embodiments, the data compression process or devices described herein may be applied to the encoding and decoding of audio data, image data, and/or video data. In particular, the present application describes a method and process of data compression that uses adaptive filtering in the transform domain.

In one aspect, the present application describes method for encoding an image, the image including a block of original pixels. The method includes selecting a predictive block of pixels; spectrally transforming the block of original pixels to obtain a transformed original block; spectrally transforming the predictive block of pixels to obtain a transformed prediction block; generating a block of transform domain filter coefficients based, at least in part, upon the transformed original block and the transformed prediction block; and entropy encoding the filter coefficients in an output bitstream.

In another aspect, the present application describes method of decoding a bitstream that encodes an image, the image having a block of pixels. The method includes entropy decoding the bitstream to obtain a block of quantized transform domain coefficients, a block of filter coefficients, and prediction data; identifying a predictive block of pixels based on the prediction data; spectrally transforming the predictive block of pixels to obtain a transformed prediction block; calculating a filtered transform domain reconstruction from the block of filter coefficients, the transformed prediction block and the quantized transform domain coefficients; and inverse transforming the filtered transform domain reconstruction to output a block of reconstructed pixels.

In yet another aspect, the present application provides a method for calculating filter coefficients for use in encoding an image, the image including blocks of samples. The method includes spectrally transforming the blocks of samples to obtain blocks of transform coefficients; for each of the blocks of samples, spectrally transforming a block of prediction samples to obtain a block of prediction transform coefficients; and generating a block of transform domain filter coefficients based upon the blocks of transform coefficients and the blocks of prediction transform coefficients.

In yet a further aspect, the present application provides a method of filtering for use in a decoder for reconstructing a block of samples for an image, wherein the decoder has a predictive block of samples associated with the block of samples. The method includes spectrally transforming the predictive block of samples to obtain a transformed prediction block; calculating a filtered transform domain reconstruction by applying a block of filter coefficients to at least a portion of the transformed prediction block.

In a further aspect, the present application describes encoders and decoders configured to implement such methods of encoding and decoding.

In yet a further aspect, the present application describes non-transitory computer-readable media storing computer-executable program instructions which, when executed, configured a processor to perform the described methods of encoding and/or decoding.

Other aspects and features of the present application will be understood by those of ordinary skill in the art from a review of the following description of examples in conjunction with the accompanying figures.

In the description that follows, some example embodiments are described with reference to the H.264 standard for video coding. Those ordinarily skilled in the art will understand that the present application is not limited to H.264 but may be applicable to other video coding/decoding standards, including possible future standards, such as HEVC. It will also be appreciated that the present application is not necessarily limited to video coding/decoding and may be applicable to audio coding/decoding, image coding/decoding, or the lossy coding/decoding of any other data. The present application is broadly applicable to any lossy data compression process that employs a prediction operation, a spectral transform of a residual following the prediction operation, and quantization of the transformed residual, irrespective of the type of data being coded/decoded.

In the description that follows, when referring to video or images the terms frame and slice may be used somewhat interchangeably. Those of skill in the art will appreciate that, in the case of the H.264 standard, a frame may contain one or more slices. It will also be appreciated that certain encoding/decoding operations are performed on a frame-by-frame basis and some are performed on a slice-by-slice basis, depending on the particular requirements of the applicable image or video coding standard. In any particular embodiment, the applicable image or video coding standard may determine whether the operations described below are performed in connection with frames and/or slices, as the case may be. Accordingly, those ordinarily skilled in the art will understand, in light of the present disclosure, whether particular operations or processes described herein and particular references to frames, slices, or both are applicable to frames, slices, or both for a given embodiment.

To the extent that the processes or methods described below are applied to images and/or video they may be applied on a block-basis, a coding-unit-basis, a slice-basis, a frame-basis, a Group-of-Pictures (GOP) basis, or otherwise, as will be appreciated by those ordinarily skilled in the art after a full review of the following description. A coding unit may be any block or group of blocks prescribed by the applicable standard as the basic coding unit; for example, the coding unit in H.264/AVC is a 16×16 macroblock. HEVC may specify one or more coding units; the size of the coding unit may vary in some implementations and, in some cases, a frame or image may include more than one type/size of coding unit. To the extent that the process or methods described herein are applied to audio, such as music or voice data, they may be applied to a grouping or sequence of data points, e.g. an audio sample.

Figure 2:
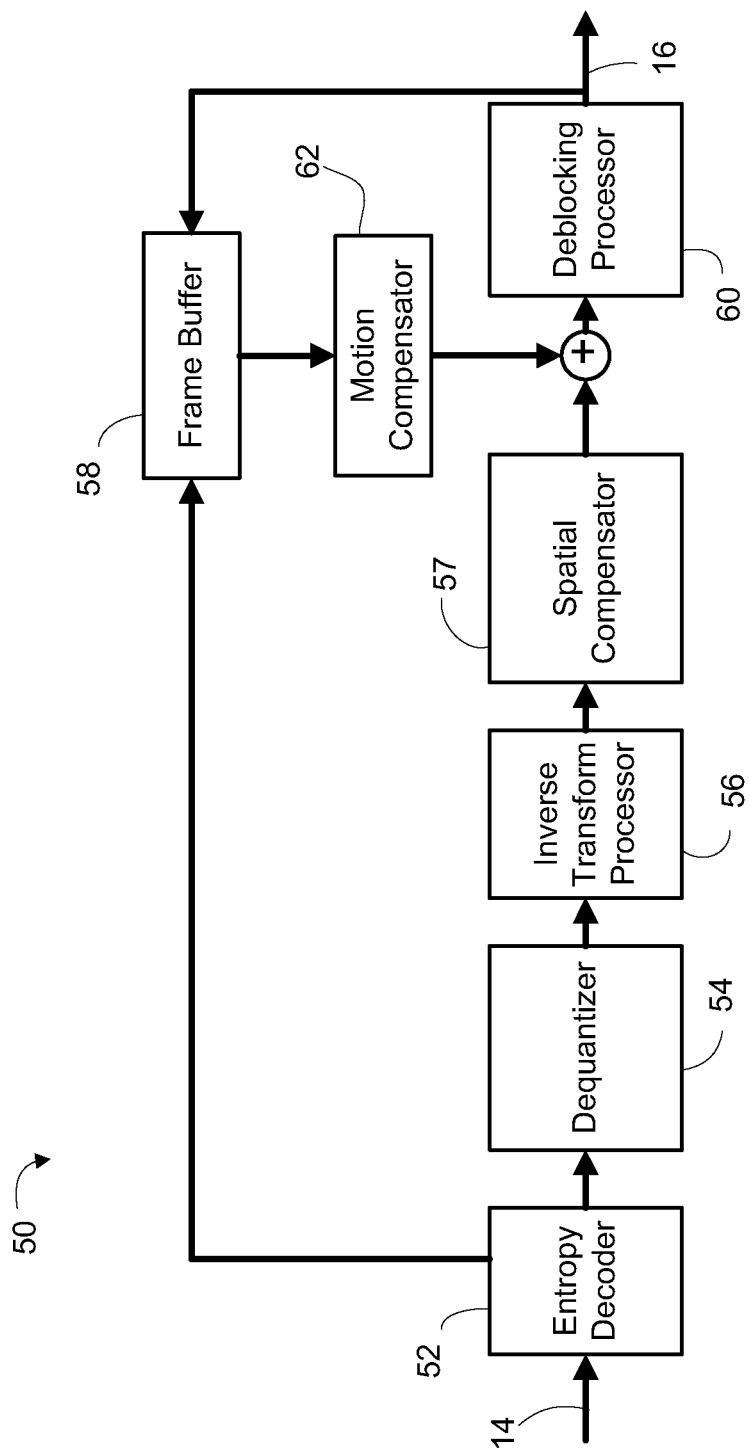
FIG. 2 shows, in block diagram form, a decoder for decoding video.

Reference is now made to FIG. 1, which shows, in block diagram form, an encoder 10 for encoding video. Reference is also made to FIG. 2, which shows a block diagram of a decoder 50 for decoding video. It will be appreciated that the encoder 10 and decoder 50 described herein may each be implemented on an application-specific or general purpose computing device, containing one or more processing elements and memory. The operations performed by the encoder 10 or decoder 50, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder 10 or decoder 50 may be implemented will be appreciated by those ordinarily skilled in the art having regard to the following description.

The encoder 10 receives a video source 12 and produces an encoded bitstream 14. The decoder 50 receives the encoded bitstream 14 and outputs a decoded video frame 16. The encoder 10 and decoder 50 may be configured to operate in conformance with a number of video compression standards. For example, the encoder 10 and decoder 50 may be H.264/AVC compliant. In other embodiments, the encoder 10 and decoder 50 may conform to other video compression standards, including evolutions of the H.264/AVC standard, such as HEVC.

The encoder 10 includes a spatial predictor 21, a coding mode selector 20, transform processor 22, quantizer 24, and entropy encoder 26. As will be appreciated by those ordinarily skilled in the art, the coding mode selector 20 determines the appropriate coding mode for the video source, for example whether the subject frame/slice is of I, P, or B type, and whether particular macroblocks or coding units within the frame/slice are inter or intra coded. The transform processor 22 performs a transform upon the pixel domain data. In particular, the transform processor 22 applies a block-based transform to convert pixel domain data to spectral components. For example, in many embodiments a discrete cosine transform (DCT) is used. Other transforms, such as a discrete sine transform or others may be used in some instances. The block-based transform is performed on a coding unit or sub-coding-unit basis, depending on the size of the coding units. In the H.264 standard, for example, a typical 16×16 macroblock contains sixteen 4×4 transform blocks and the DCT process is performed on the 4×4 blocks. In some cases, the transform blocks may be 8×8, meaning there are four transform blocks per macroblock. In yet other cases, the transform blocks may be other sizes. In some cases, a 16×16 macroblock may include a non-overlapping combination of 4×4 and 8×8 transform blocks.

Applying the block-based transform to a block of pixel data results in a set of transform domain coefficients. A "set" in this context is an ordered set in which the coefficients have coefficient positions. In some instances the set of transform domain coefficients may be considered a "block" or matrix of coefficients. In the description herein the phrases a "set of transform domain coefficients" or a "block of transform domain coefficients" are used interchangeably and are meant to indicate an ordered set of transform domain coefficients.

The set of transform domain coefficients is quantized by the quantizer 24. The quantized coefficients and associated information are then encoded by the entropy encoder 26.

Intra-coded frames/slices (i.e. type I) are encoded without reference to other frames/slices. In other words, they do not employ temporal prediction. However intra-coded frames do rely upon spatial prediction within the frame/slice, as illustrated in FIG. 1 by the spatial predictor 21. That is, when encoding a particular block the data or samples in the block may be compared to the data of nearby pixels within blocks already encoded for that frame/slice. Using a prediction algorithm, the source data of the block may be converted to residual data. The transform processor 22 then encodes the residual data. H.264, for example, prescribes nine spatial prediction modes for 4×4 transform blocks. In some embodiments, each of the nine modes may be used to independently process a block, and then rate-distortion optimization is used to select the best mode.

The H.264 standard also prescribes the use of motion prediction/compensation to take advantage of temporal prediction. Accordingly, the encoder 10 has a feedback loop that includes a de-quantizer 28, inverse transform processor 30, and deblocking processor 32. These elements mirror the decoding process implemented by the decoder 50 to reproduce the frame/slice. A frame store 34 is used to store the reproduced frames. In this manner, the motion prediction is based on what will be the reconstructed frames at the decoder 50 and not on the original frames, which may differ from the reconstructed frames due to the lossy compression involved in encoding/decoding. A motion predictor 36 uses the frames/slices stored in the frame store 34 as source frames/slices for comparison to a current frame for the purpose of identifying similar blocks. Accordingly, for macroblocks to which motion prediction is applied, the "source data" which the transform processor 22 encodes is the residual data that comes out of the motion prediction process. For example, it may include information regarding the reference frame, a spatial displacement or "motion vector", and residual pixel data that represents the differences (if any) between the prediction (reference block) and the current block. Information regarding the reference frame and/or motion vector may not be processed by the transform processor 22 and/or quantizer 24, but instead may be supplied to the entropy encoder 26 for encoding as part of the bitstream along with the quantized coefficients.

Those ordinarily skilled in the art will appreciate the details and possible variations for implementing H.264 encoders.

The decoder 50 includes an entropy decoder 52, dequantizer 54, inverse transform processor 56, spatial compensator 57, and deblocking processor 60. A frame buffer 58 supplies reconstructed frames for use by a motion compensator 62 in applying motion compensation. The spatial compensator 57 represents the operation of recovering the video data for a particular intra-coded block from a previously decoded block.

The bitstream 14 is received and decoded by the entropy decoder 52 to recover the quantized coefficients. Side information may also be recovered during the entropy decoding process, some of which may be supplied to the motion compensation loop for use in motion compensation, if applicable. For example, the entropy decoder 52 may recover motion vectors and/or reference frame information for inter-coded macroblocks.

The quantized coefficients are then dequantized by the dequantizer 54 to produce the transform domain coefficients, which are then subjected to an inverse transform by the inverse transform processor 56 to recreate the pixel domain "video data". It will be appreciated that, in some cases, such as with an intra-coded macroblock, the recreated "video data" is the residual data for use in spatial compensation relative to a previously decoded block within the frame. The spatial compensator 57 generates the video data from the residual data and reconstructed pixel data from a previously decoded block. In other cases, such as inter-coded macroblocks, the recreated "video data" from the inverse transform processor 56 is the residual data for use in motion compensation relative to a reconstructed reference block from a different frame. Both spatial and motion compensation may be referred to herein as "prediction operations".

The motion compensator 62 locates a reference block within the frame buffer 58 specified for a particular inter-coded macroblock. It does so based on the reference frame information and motion vector specified for the inter-coded macroblock. It then supplies the reference block pixel domain data for combination with the dequantized inverse-transformed residual data to arrive at the reconstructed video data for that macroblock.

A deblocking process may then be applied to a reconstructed frame/slice, as indicated by the deblocking processor 60. After deblocking, the frame/slice is output as the decoded video frame 16, for example for display on a display device. It will be understood that the video playback machine, such as a computer, set-top box, DVD or Blu-Ray player, and/or mobile handheld device, may buffer decoded frames in a memory prior to display on an output device. In some instances, other post-processing filter operations may be applied to the pixel domain data before being output.

It is expected that HEVC-compliant encoders and decoders will have many of these same features.

In the description of example embodiments that follows, the following symbol definitions are used:

x=the original frame/block of pixels
p=the predictive block of pixels
$c_x$=the transform of x
$c_p$=the transform of p
z=the pixel domain residual=x−p
$c_z$=the transform of z, i.e. the transform domain coefficients
u=the quantized transform domain coefficients=$Q(c_z)$, where $Q(\bullet)$ denotes the quantization function, and $Q^{-1}(\bullet)$ denotes the inverse quantization function. For example, for a uniform scalar quantization function, the output of $Q(c_z)$ at position (i,j) is given by $$Q(c_{z,i,j})=\text{sign}(c_z)*\text{floor}(\text{abs}(c_{z,i,j})/q_{i,j}),$$

where $\text{sign}(\bullet)$ denotes the sign function, $\text{floor}(\bullet)$ denotes the floor function, $\text{abs}(\bullet)$ denotes the absolute function, and $q_{i,j}$ denotes the quantization step size at position (i,j).

$\hat{x}$=the reconstructed block of pixels=$p+T^{-1}(Q^{-1}(u))$.

The distortion in a reconstructed block of pixels is the difference between the original block of pixels, x, and its reconstruction $\hat{x}$ at the decoder. Filtering is sometimes applied to the reconstruction $\hat{x}$ in order to reduce distortion. From a signal processing point of view, this may be categorized as low pass filtering. Such filtering generally involves a convolution operation in the pixel domain. It will be appreciated that convolution operations are computationally demanding. Because of the feedback loop at the encoder this computational complexity is present in both the encoding and decoding operations.

In accordance with one aspect of the present application, the quantization distortion is filtered in the transform domain instead of in the pixel domain. Based on having a spectral transform, such as DCT, with unitary property, the filtering normally done to minimize the difference in the pixel domain between the original block of pixels and the reconstructed block of pixels may be carried out in the transform domain before the reconstruction is inverse transformed to create the reconstructed block of pixels.

In the transform domain, the quantization distortion may be expressed as:

$$|c_x - c_p - Q^{-1}(u)|^2 \triangleq \Sigma_{i,j} |c_{x,i,j} - c_{p,i,j} - Q^{-1}(u_{i,j})|^2 \quad (1)$$

In the case where scalar quantization is used, $Q^{-1}(u) = u*q$, where * represents element-wise multiplication between vectors/matrices.

Because of the unitary property of the transform operation, e.g. DCT, the quality loss in the pixel domain is equivalent to the distortion in the transform domain. In other words:

$$|c_x - c_p - Q^{-1}(u)|^2 = |x - p - T^{-1}(Q^{-1}(u))|^2 \quad (2)$$

where $T^{-1}$ represents the inverse transform operation.

Convolution in the pixel domain is the equivalent of scaling/multiplication in the transform domain, meaning that a filter realized in the transform domain will be more computationally efficient to implement. Moreover, $u*q$ is already available in the transform domain, thus further reducing the computational complexity.

The aim of a transform domain filter is to reduce quantization distortion. In order for a decoder to apply such a filter, the encoder will transmit the filter coefficients in the bitstream of encoded data. Accordingly, design of the filter at the encoder may be considered from a rate-distortion point of view. A rate-distortion expression for finding a desired filter for N blocks $x_1, x_2, \ldots, x_N$ is as follows:

$$\min_f \sum_{k=1}^{N} |c_{x_k} - f * (c_{p_k} + Q^{-1}(u_k))|^2 + \lambda \cdot r(f) \quad (3)$$

Equation (3) reflects a Lagrangian cost function for finding an optimal filter from a rate-distortion point of view. The first term represents the distortion. It will be noted that the distortion in this term is the difference between the transformed original block of samples and the filtered transform domain reconstruction. The cost of sending the filter coefficients is represented by the rate function $r(f)$. $\lambda$ is the Lagrange multiplier.

The symbol f in Equation (3) represents the filter; more specifically, a set or block of filter coefficients in a filter matrix used to scale the transform domain reconstruction. Accordingly, Equation (3) provides a basis for selecting the filter coefficients.

It will be recalled that the quantization vector q is a scaling factor. In some embodiments, the quantization vector q may be a vector/matrix specifying quantization values for each coefficient position in the block/matrix. An example is described in U.S. patent application Ser. No. 12/830,548, filed Jul. 6, 2010, and entitled "Methods and Devices for Data Compression Using Adaptive Reconstruction Levels", owned in common herewith. In such a situation, in which the quantization scaling factor for each coefficient position will be signaled to the decoder, Equation (3) may be reformulated as:

$$\min_f \sum_{k=1}^{N} |c_{x_k} - f * (c_{p_k} + u_k * q)|^2 + \lambda \cdot r(f) \quad (4)$$

Furthermore, it will be recalled that the quantization operation to calculate the quantized transform domain coefficients, $u_k$, occurs after the prediction operation that produces the prediction $p_k$ and, thus, the transformed prediction block $c_{p_k}$. It has also been observed by the present inventors that some elements of $c_{p_k}$ are negatively correlated with the elements of $c_{z_k}$. Accordingly, Equation (4) may be simplified as:

$$\min_f \sum_{k=1}^{N} |c_{x_k} - f * c_{p_k}|^2 + \lambda \cdot r(f) \quad (5)$$

Equation (5) realizes a filter that reduces the residual energy. The residual in this case is the difference between the original block of samples x and the filtered predictive block of samples.

Equations (3) and (5) lead to two possible processes for generating a transform domain filter f. The process according to Equation (3) results in a filter for filtering the reconstruction in the transform domain. The process according to Equation (5) results in a filter for filtering the prediction in the transform domain. They will be described in turn below.

If the filter coefficients are calculated and signaled sufficiently infrequently, the rate aspect of Equation (3) may be negligible. Using this simplification, we can restate the expression for finding a desired filter as follows:

$$\min_f \sum_{k=1}^{N} |c_{x_k} - f * (c_{p_k} + Q^{-1}(u_k))|^2 \quad (6)$$

Figure 3:
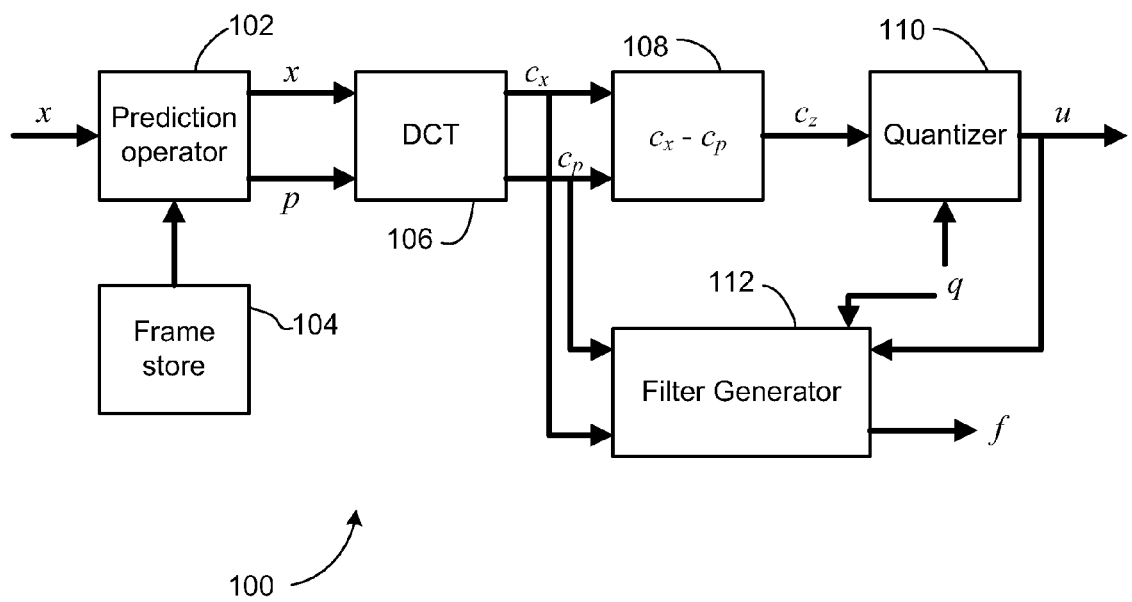
FIG. 3 shows a block diagram of an example encoder with transform domain filtering.

Reference is now made to FIG. 3, which shows a simplified block diagram of an encoder 100 with adaptive transform domain filtering. The encoder 100 includes a prediction operator 102 for selecting or generating the predictive block of samples/pixels p. The prediction operator 102 receives the original block of samples/pixels x, and may have access to a frame store 104 in which previously encoded and reconstructed frames are stored. The prediction operator 102 may apply temporal or spatial prediction. In other words, the prediction operator 102 may perform intra spatial prediction, or may apply inter motion estimation, depending on the frame type and coding mode, etc.

The original block of samples x and the predictive block of samples p are input to a spectral transform operator 106, such as a DCT. The spectral transform operator 106 produces the transformed original block of samples $c_x$ and the transformed predictive block of samples $c_p$. The encoder 100 includes a residue calculator 108, which finds the transform domain residual $c_z$ as the difference between the transformed original block of samples $c_x$ and the transformed predictive block of samples $c_p$. A quantizer 110 quantizes the transform domain residual $c_z$ to generate the quantized transform domain coefficients u.

The encoder 100 further includes a filter generator 112. The filter generator 112 receives the transformed original block of samples $c_x$, the transformed predictive block of samples $c_p$, the quantized transform domain coefficients u, and the quantization matrix/vector or scaling factor q. From this data the filter generator 112 produces the filter coefficients f, for example using Equation (3) or (6).

The filter coefficients are included in the bitstream output from the encoder. In many embodiments, the filter coefficients may be entropy encoded and the encoded coefficients are inserted in the bitstream. In yet further embodiments, the filter coefficients may be quantized prior to entropy encoding. It will be understood that in that latter situation the decoder will need to decode the quantized coefficients and then dequantize them to realize reconstructed filter coefficients. It will also be appreciated that the quantization may introduce distortion and that a rate-distortion optimization process may be used in the quantization process to select the quantization step size for the filter coefficients.

The entropy encoding of the filter coefficients may rely upon any suitable encoding scheme. Examples include variable length coding (VLC), arithmetic coding, or variable-length-to-variable-length (V2V) coding.

The entropy encoding of the filter coefficients may be included in the beginning of the stream for a slice, e.g., in the slice header, or at the end of a slice, depending on applications. When it is transmitted in the slice header, the coefficients are usually calculated based on some previously-coded slices. In this case, the filtering process may be applied during the mode selection. One drawback of doing this might be the data mismatch between previously-coded slices and the current slice. When the coefficients are transmitted at the end of a slice, they can be calculated based on the current slice. Yet, the filtering process cannot be included in the mode selection process, unless multi-pass coding is allowed.

When the coefficients are transmitted in the beginning, the slice header syntax may specify a syntax function: aftd_param( ) for implementing adaptive reconstruction levels. An example of this syntax function may be given by:

| aftd_param( ) { | Descriptor |
|---|---|
| aftd_slice_flag | u(1) |
| If(aftd_slice_flag) | |
| { | |
| aftd_delta_idx[1] | u(1) |
| for(i=2;i<=Torder;i++) | |
| { | |
| aftd_delta_i_available[i] | u(1) |
| if(aftd_delta_i_available[i]) { | |
| aftd_delta_idx[i] | vlc(v) |
| } | |
| } | |
| } | |
| } | |

The syntax element aftd_delta_idx[i] specifies the i-th filtering coefficient. The number of Torder specifies the number of filter coefficients to be transmitted. For a block size of 4×4, one choice of Torder may be 8, meaning that only 8 positions in one 4×4 block will be filtered and other positions are generally assuming a zero coefficient.

The choice of 8 as the number of coefficients is exemplary. In general, there is a trade-off between the overhead bits for transmitting these coefficients and the resulting distortion reduction by applying the filtering. Also, another choice to be made is positions in the DCT block to apply nonzero coefficient. One approach is to choose positions along the scanning order starting from the DC component, e.g., to follow the zig-zag scanning order.

It will be appreciated in this exemplary implementation, the AFTD coefficients are coded using predictive coding, i.e., the set of coefficients from a previous slice, e.g., a slice of the same type, are used as a prediction for the coefficients for the current slice and only the difference will be transmitted. In this case, the element aftd_delta_idx[i] represents the difference between the real i-th coefficient for the current slice aftd[i] and its prediction. Upon receiving aftd_delta_idx[i], the decoder will recover the real coefficient aftd[i] as follows:

$$aftd[i]=pred\_aftd[i]+Idx2Data[aftd\_delta\_idx[i]],$$

where pred_aftd[i] is the prediction, and Idx2Data gives a quantization codebook for transmitting the difference. One exemplary codebook may be int Idx2Delta[16]={−15,−13,−11,−9,−7,−5,−3,0,1,3,5,
      7,9,11,13,15};

It will be noted that the difference between the real coefficient and its prediction is clipped to a [−15, 15] range in the above exemplary codebook. In addition, the codebook assumes 8-bits precision for representing floating point numbers with fixed-point integers.

Another exemplary implementation for the coefficient transmission may be to signal the coefficient directly, because in many cases inter-slice/frame independency is highly desired. In this case, no prediction from previous slice should be used. The coefficients will be quantized and the index will be transmitted directly.

| aftd_param( ) { | Descriptor |
|---|---|
| aftd_slice_flag | u(1) |
| If(aftd_slice_flag) | |
| { | |
| aftd_idx[1] | u(1) |
| for(i=2;i<=Torder;i++) | |
| { | |
| aftd_i_available[i] | u(1) |
| if(aftd_i_available[i]) { | |
| aftd_idx[i] | vlc(v) |
| } | |
| } | |
| } | |
| } | |

The decoder may recover a coefficient from the syntax element aftd_idx[i] as follow: aftd[i]=(Idx2Coef[aftd[idx]]*2+256); where Idx2Coef=[−31, −29, . . . , −1, 1, 3, . . . , 29, 31]. Note that the aftd coefficients are represented by 8-bit fixed-point integers. The real value of the coefficient is obtained as aftd[i]/256. Note that the above implementation still assumes some range of the filter coefficients, i.e., they are around the real value of 1.0. For 8-bits fixed-point representation, it corresponds to a default value of 256. Only the difference between the real value and the default value of 1.0 is transmitted. It will be appreciated that the specific blocks of the encoder 100 shown in FIG. 3 are for the purpose of illustration. Implementations of the process may differ. For example, instead of calculating the transform domain residual as the difference between the transformed original block of samples $c_x$ and the transformed predictive block of samples $c_p$, the residual z may be determined in the pixel domain as the difference between the original block of pixels x and the predictive block of pixels p. The residual z may then be transformed by the spectral transform operator to generate the transform domain coefficients $c_z$.

Figure 4:
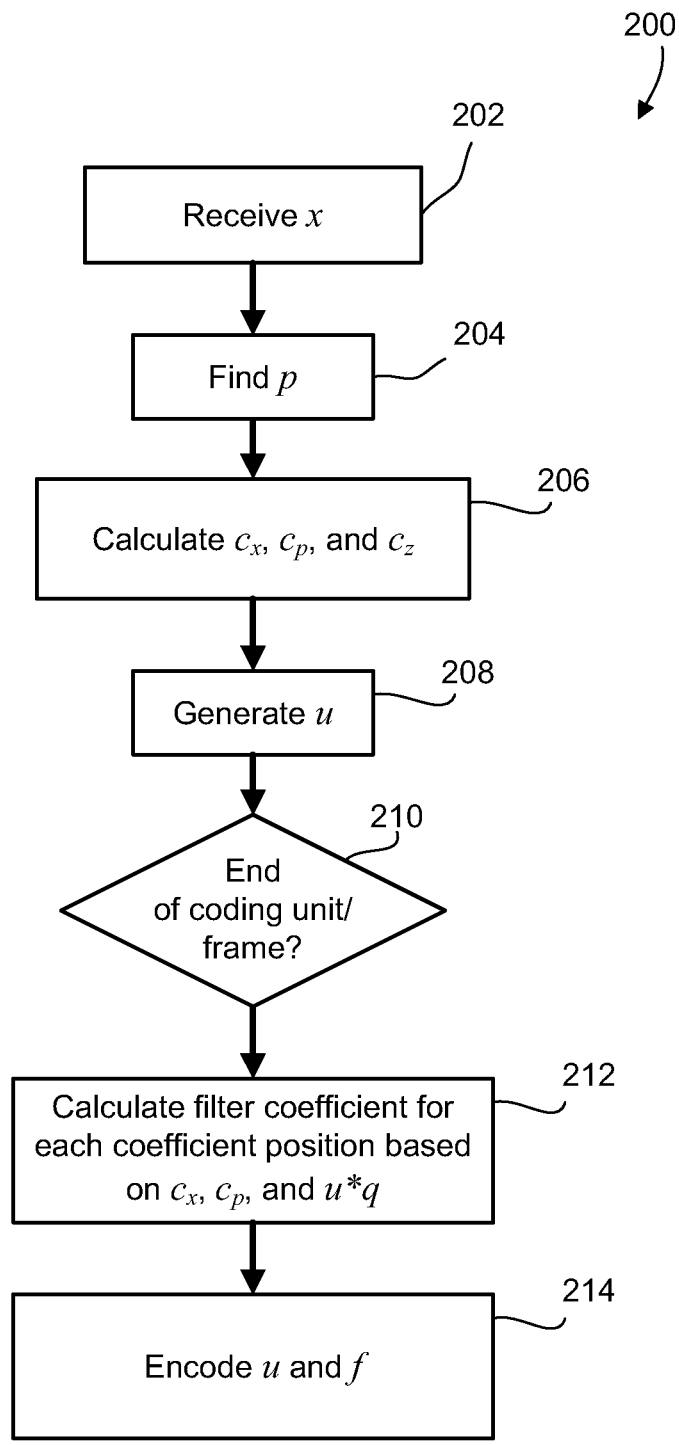
FIG. 4 shows a flowchart illustrating an example method of encoding.

One example implementation is now described with reference to FIG. 4, which shows, in flowchart form, one example embodiment of the process 200 for data compression with adaptive transform domain filtering. The process 200 begins in operation 202 with receipt of the original block of samples/pixels x. A prediction operation is then used to find the predictive block of samples p in operation 204.

In operation 206, the encoder calculates the transform domain original $c_x$, the transform domain prediction $c_p$, and the transform domain residual coefficients $c_z$. As noted above the residual may be found in the pixel domain and then transformed, or may be calculated as the difference between $c_x$ and $c_p$.

The quantized transform domain coefficients u are generated in operation 208.

In operation 210, the encoder assesses whether it has reached the end of the coding unit and/or frame (depending upon whether it is filtering on a coding unit or frame basis). If not, then it returns to operation 202 to encode the next block of original samples. If so, then in operation 212 the encoder calculates the filter coefficients for the coding unit/frame. The coefficient positions are indicated using the indices i and j. Each filter coefficient $f_{ij}$ may be calculated as a ratio of sums taken over the number of blocks n, where n is the number of blocks in the coding unit or frame, as the case may be. In one embodiment, the numerator is the sum of values from the same $ij^{th}$ coefficient position in the transform domain original block $c_x$. The denominator may be the sum of values from the same $ij^{th}$ coefficient position of the transform domain reconstruction, which is the transform domain predictive block $c_p$ plus the reconstructed transform domain residual given by $Q^{-1}(u)$. The filter coefficients may, thus, be calculated in accordance with the expression:

$$f_{ij} = \frac{\sum_{k=1}^{N} c_{x_k, ij}}{\sum_{k=1}^{N} (c_{p_k, ij} + Q^{-1}(u_{k,ij}))} \qquad (7)$$

In an alternative embodiment, the following expression may be used. The following expression is still an approximate solution to Equation (4), and is based on the assumption that the Lagrangian multiplier is zero, which is usually acceptable given that r(f) tends to be small:

$$f_{ij} = \frac{\sum_{k=1}^{N} c_{x_k, ij} \cdot (c_{p_k, ij} + Q^{-1}(u_{k,i,j}))}{\sum_{k=1}^{N} (c_{p_k, ij} + Q^{-1}(u_{k,ij}))^2} \qquad (8)$$

The encoder may be configured to use a default filter coefficient in the case that the denominator sums to zero, so as to avoid a divide-by-zero problem. The default filter coefficient may, in some embodiments, be zero. It will also be appreciated that filter coefficients are not necessarily calculated for all coefficient positions ij; in some cases, the calculated filter coefficients will only include coefficients for a predetermined number of the coefficient positions, and the remaining use a default filter coefficient, for example, set to 1. For example, in the case of a 4×4 block the filter coefficients may only be calculated for the first n coefficient positions in the zig-zag scanning order, where n may be preselected to be any suitable integer less than 16. Remaining positions may be assumed to be a preselected filter value or null filter value. It will be understood that the preselected or null filter values are not transmitted in the bitstream.

Although operation 212 is illustrated as occurring after the end of the coding unit/frame has been reached for ease of illustration, it will be appreciated that the encoder may accumulate values throughout the encoding process of operations 202 to 210 for building the sums in the numerator and denominator, meaning that operation 212 is embedded in the looped process of operations 202 through 210.

In operation 214, the encoder, using an entropy encoding scheme, entropy encodes the generated quantized transform domain coefficients u and the filter coefficients f to create an output bitstream of encoded data. It will be understood that other data is also entropy encoded in the bitstream in certain embodiments, such as motion vectors, coding mode indices, quantization scaling matrices, etc. As noted above, the coding of the filter coefficients may use any suitable entropy encoding scheme, including VLC, V2V, or arithmetic coding. Also as noted above, the filter coefficients may, in some embodiments, be quantized prior to encoding. In some instances, rather than encoding the filter coefficients themselves, a prediction and residual are encoded. For example, the prediction may be based on the immediately preceding filter coefficients with the residual being the difference between those coefficients and the currently calculated filter coefficients. In some cases, the prediction operation may involve indexing a predetermined or previously calculated set of filter coefficients that are best match to the currently calculated filter coefficients, with the residual being the difference between the indexed coefficients and the current coefficients. More generally, the prediction is some function f(x), where x are the coefficients of the previous unit and y are the coefficients of the current unit. In such a case, the residual encoded is y-f(x).

Figure 5:
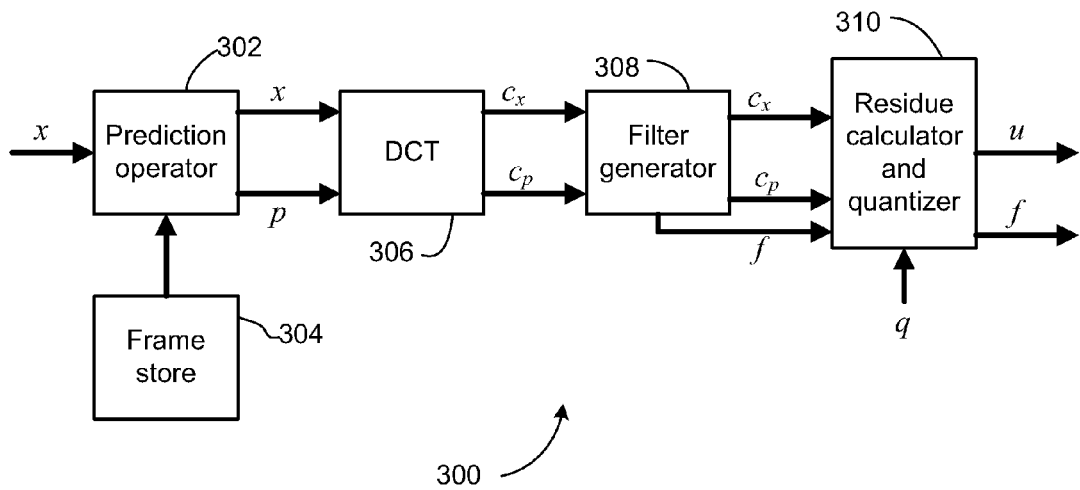
FIG. 5 shows a block diagram of another example encoder with transform domain filtering.

Reference will now be made to FIG. 5, which shows another example embodiment of an encoder 300 configured for transform domain filtering. As with the encoder 100 of FIG. 3, the encoder 300 includes a prediction operator 302, a frame store 304 and a spectral transform operator 306. The spectral transform operator 306 outputs the blocks of transform coefficients $c_x$ and the blocks of prediction transform coefficients $c_p$.

The encoder 300 includes a filter generator 308 that receives the blocks of transform coefficients $c_x$ and the blocks of prediction transform coefficients $c_p$. The filter generator 308 produces the filter coefficients in accordance with Equation (5). That is, the filter generator 308 finds filter coefficients that tend to minimize the difference between the blocks of transform coefficients $c_x$ and the blocks of prediction transform coefficients $c_p$.

The encoder 300 further includes a residual calculator 310. In this example embodiment, the residuals are calculated based upon the filtered prediction. That is, the residual calculator 310 finds the quantized transform domain coefficients u on the basis of:

$$u = Q(c_x - (f * c_p)) \qquad (9)$$

Figure 6:
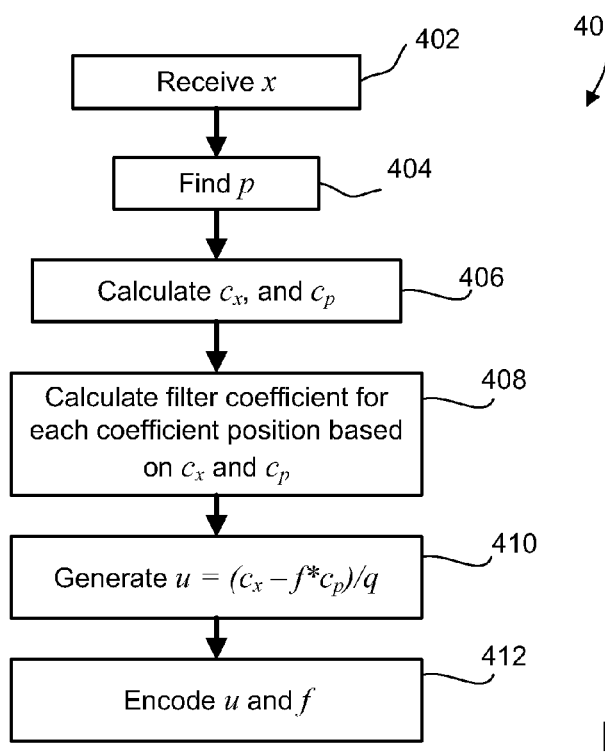
FIG. 6 shows a flowchart illustrating another example method of encoding.

One example implementation is now described with reference to FIG. 6, which shows, in flowchart form, a further example embodiment of the process 400 for data compression with adaptive transform domain filtering. The process 400 begins in operation 402 with receipt of the original blocks of samples x. A prediction operation is then used to find the predictive block of samples p in operation 404.

In operation 406, the encoder calculates the blocks of transform domain coefficients $c_x$ and the blocks of prediction transform coefficients $c_p$. Operation 408 is the calculation of the filter coefficients. It will be appreciated that operations 402 to 406 may be repeated for all blocks of a coding unit or frame, as the case may be. It will also be appreciated that the calculation in operation 408 may be embedded with the loop of operations 402 to 406, such that the encoder sums values in the numerator and denominator as the values are calculated in operation 406.

Each $ij^{th}$ filter coefficient $f_{ij}$ may be calculated as a ratio of sums taken over the number of blocks n, where n is the number of blocks in the coding unit or frame, as the case may be. In one embodiment, the numerator is the sum of values from the same $ij^{th}$ coefficient position in the blocks of transform coefficients $c_x$. The denominator may be the sum of values from the same $ij^{th}$ coefficient position of the blocks of prediction transform coefficients $c_p$. Note that this calculation does not include the reconstructed residuals as part of determining the filter coefficients. The filter coefficients may, thus, be calculated in accordance with the expression:

$$f_{ij} = \frac{\sum_{k=1}^{N} c_{x_k, ij}}{\sum_{k=1}^{N} (c_{p_k, ij})} \quad (10)$$

An alternative expression for finding the coefficients is set out below:

$$f_{ij} = \frac{\sum_{k=1}^{N} c_{x_k, ij} \cdot (c_{p_k, ij})}{\sum_{k=1}^{N} (c_{p, ij})^2} \quad (11)$$

The encoder may be configured to use a default filter coefficient in the case that the denominator sums to zero, so as to avoid a divide-by-zero problem. The default filter coefficient may, in some embodiments, be zero.

After the filter coefficients f have been determined for the coding unit/frame, then in operation 410 the transform domain residue is determined. In particular the encoder calculates the quantized transform domain coefficients, u, using Equation (8), for example.

In operation 412, the quantized transform domain coefficients u, the filter coefficients f, and other data is then entropy encoded to produce a bitstream of encoded data.

From the foregoing detailed discussion of examples, it will be understood that the determination and application of a filter f may be on a frame basis, on a coding unit basis, or on the basis of any other collection of blocks, such as a Group of Pictures or slice.

It will also be understood from the present description that more than one filter f, i.e. block of filter coefficients, may be calculated for the frame (or coding unit, etc.) if there is more than one transform block size. For example, there may be a 4×4 filter matrix for use with 4×4 blocks, a 8×8 filter matrix for use with 8×8 blocks, etc.

To enable the decoder to start decoding as quickly as possible, the encoder may delay outputting the encoded bitstream by one frame (or coding unit, etc., as the case may be) so that the filter coefficients f may be specified at the beginning of the encoded data for the frame/coding unit.

Figure 7:
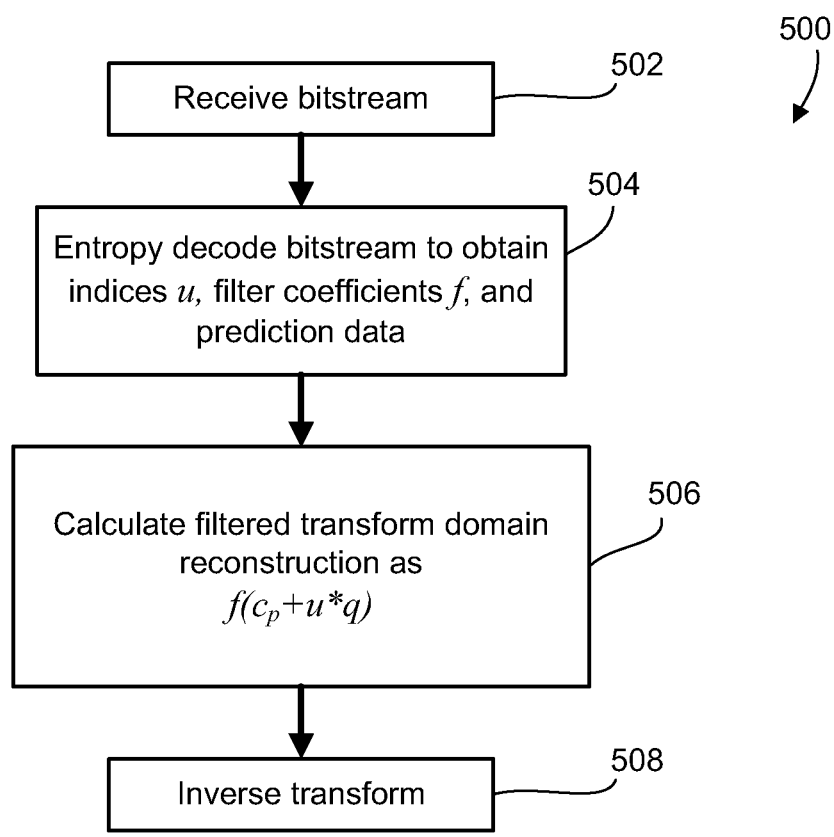
FIG. 7 shows a flowchart illustrating a first example method of decoding with transform domain filtering.

Reference is now made to FIG. 7, which shows, in flowchart form, a process 500 for decoding an encoded bitstream of data using transform domain filtering. The process 500 includes receiving the bitstream in operation 502 and entropy decoding the bitstream in operation 504 to recover the quantized transform domain coefficients u, the filter coefficients f, and other data, such as data that enables the decoder to determine the prediction (for example, motion vector(s) and reference frame indices).

In operation 506, the decoder calculates the filtered transform domain reconstruction, $c_{\hat{x}}$, by calculating the transform domain reconstruction as the transform domain prediction block plus the dequantized transform domain residual, and then applying the filter f. The calculation can be expressed as:

$$c_{\hat{x}} = f^*(c_p + Q^{-1}(u)) \quad (12)$$

It will be appreciated that operation 506 may include the decoder identifying or generating the predictive block of samples based on the decoded prediction data. For example, the decoder may identify the reference block from a reference frame based on motion vector information. Operation 506 may further include spectrally transforming the predictive block of samples to obtain the transform domain prediction block $c_p$. Equation (12) may then be used to realize the transform domain reconstructed block.

The decoder then, in operation 508, inverse transform the transform domain reconstruction to produce the reconstructed pixel domain block $\hat{x}$.

Figure 8:
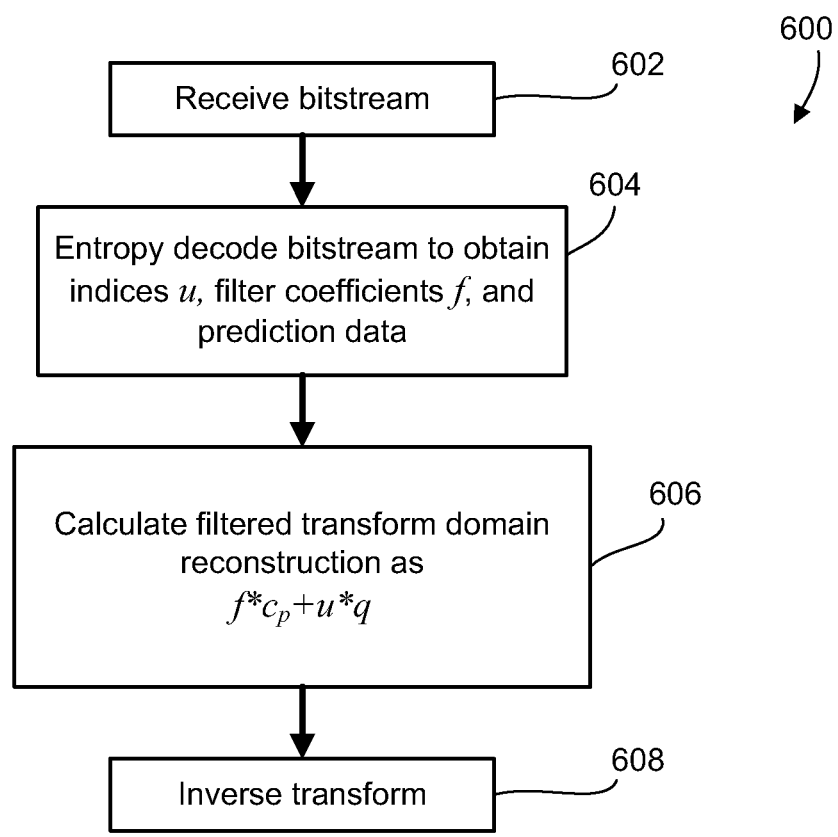
FIG. 8 shows a flowchart illustrating a second example method of decoding with transform domain filtering.

Another example decoding process 600 will now be described with reference to FIG. 8, which shows the process 600 in flowchart form. The process 600 in FIG. 8 is applicable to embodiments in which the residual was calculated from the filtered prediction at the encoder, as was described above in connection with FIGS. 5 and 6. The process 600 may also be applicable to cases in which the residual was calculated from the unfiltered prediction, like in FIGS. 3 and 4, but where the encoder transmits a quantization matrix q that specifies coefficient-position based quantization step sizes. In this case, the scaling represented by the filter matrix f may be incorporated in the quantization matrix q, meaning that it need not be applied to the reconstructed transform domain residuals at the decoder.

In operations 602 and 604 the decoder receives the bitstream and entropy decodes it to recover the quantized transform domain coefficients u, the quantization step size (or quantization vector or matrix q, in some embodiments), the filter coefficients f, and prediction data (such as motion vector(s), etc.). In operation 606, the decoder calculates the filtered transform domain reconstruction, $c_{\hat{x}}$, by calculating the sum of the filtered transform domain prediction block and the dequantized transform domain residual. The calculation may be expressed as:

$$c_{\hat{x}} = f^* c_p + Q^{-1}(u) \quad (13)$$

As detailed above in connection with operation 506, operation 606 may include the decoder generating or identifying the predictive block of samples and spectrally transforming the predictive block of samples to obtain the transform domain prediction block $c_p$.

The decoder then inverse transform the filtered transform domain reconstruction to obtain the reconstructed block of pixels $\hat{x}$.

Figure 9:
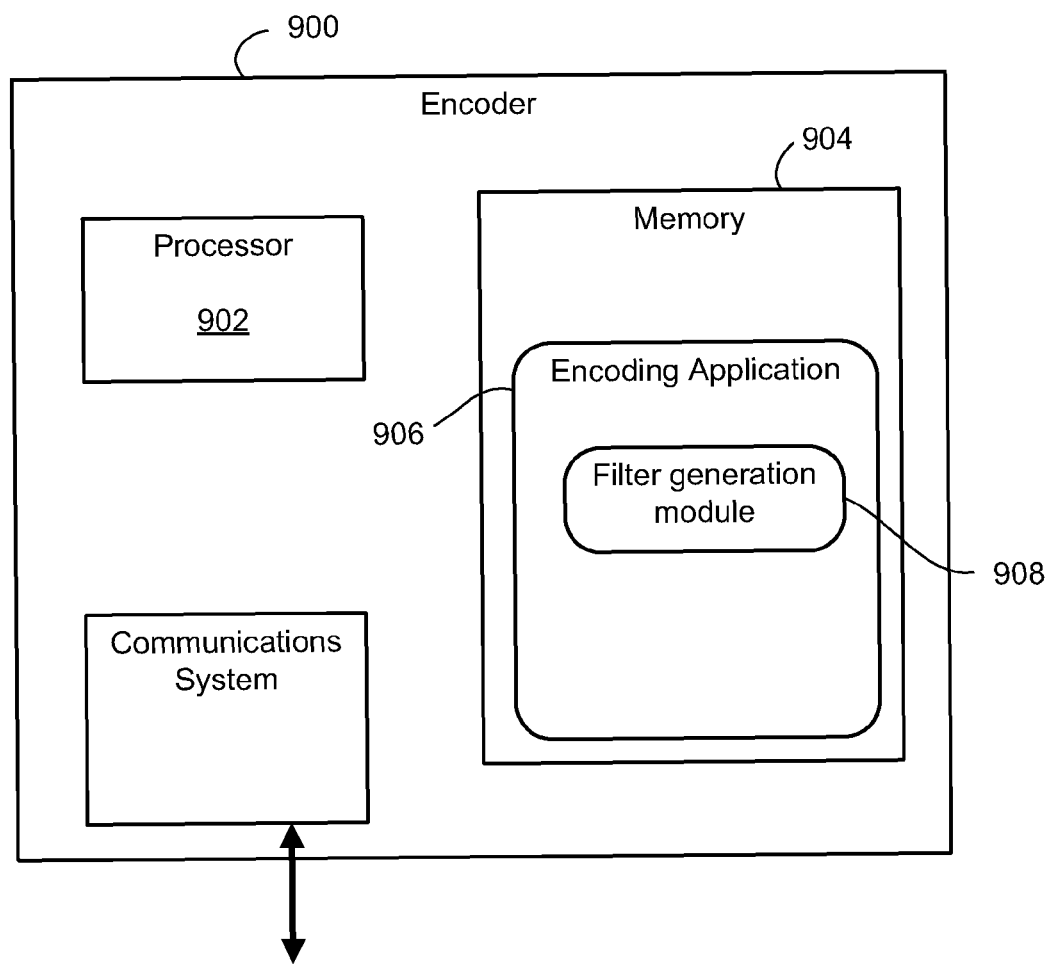
FIG. 9 shows a simplified block diagram of an example embodiment of an encoder.

Reference is now made to FIG. 9, which shows a simplified block diagram of an example embodiment of an encoder 900. The encoder 900 includes a processor 902, memory 904, and an encoding application 906. The encoding application 906 may include a computer program or application stored in memory 904 and containing instructions for configuring the processor 902 to perform steps or operations such as those described herein. For example, the encoding application 906 may encode and output bitstreams encoded in accordance with the processes described herein. The input data points may relate to audio, images, video, or other data that may be subject of a lossy data compression scheme. The encoding application 906 may include a filter generation module 908 configured to determine filter coefficients for a frame, coding unit, or other collection of blocks. The encoding application 906 may include an entropy encoder configured to entropy encode the filter coefficients f and other data as part of the bitstream. It will be understood that the encoding application 906 may be stored in on a computer readable medium, such as a compact disc, flash memory device, random access memory, hard drive, etc.

Figure 10:
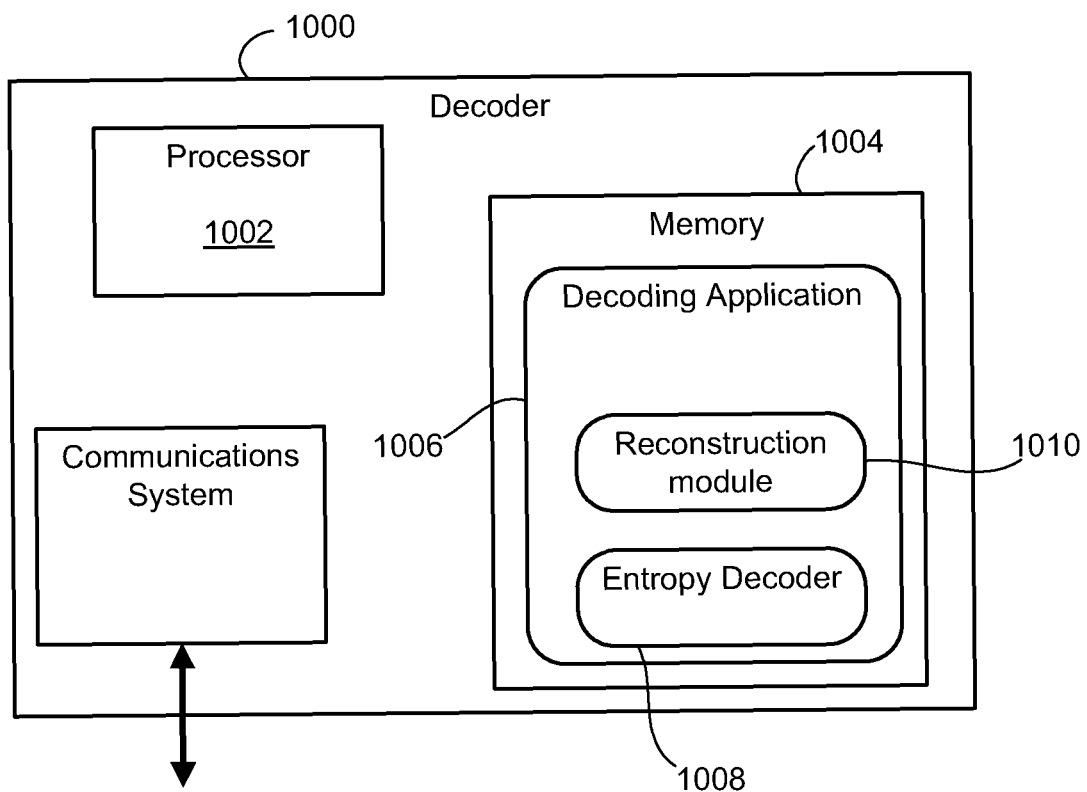
FIG. 10 shows a simplified block diagram of an example embodiment of a decoder.

Reference is now also made to FIG. 10, which shows a simplified block diagram of an example embodiment of a decoder 1000. The decoder 1000 includes a processor 1002, a memory 1004, and a decoding application 1006. The decoding application 1006 may include a computer program or application stored in memory 1004 and containing instructions for configuring the processor 1002 to perform steps or operations such as those described herein. The decoding application 1006 may include an entropy decoder 1008 and a reconstruction module 1010 configured to obtain filter coefficients f and to use them to calculate a filtered transform domain reconstruction, which the decoding application 1006 is configured to inverse transform to produce the reconstructed block of pixels. It will be understood that the decoding application 1006 may be stored in on a computer readable medium, such as a compact disc, flash memory device, random access memory, hard drive, etc.

It will be appreciated that the decoder and/or encoder according to the present application may be implemented in a number of computing devices, including, without limitation, servers, suitably programmed general purpose computers, audio/video encoding and playback devices, set-top television boxes, television broadcast equipment, and mobile devices. The decoder or encoder may be implemented by way of software containing instructions for configuring a processor to carry out the functions described herein. The software instructions may be stored on any suitable computer-readable memory, including CDs, RAM, ROM, Flash memory, etc.

It will be understood that the encoder described herein and the module, routine, process, thread, or other software component implementing the described method/process for configuring the encoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of encoding an image in an encoding device using a processor, the image including blocks of samples, the method comprising:
spectrally transforming the blocks of samples to obtain blocks of transform coefficients;
for each of the blocks of samples, spectrally transforming a block of prediction samples to obtain a block of prediction transform coefficients;
generating a block of transform domain filter coefficients based upon the blocks of transform coefficients and the blocks of prediction transform coefficients; and
for each of the blocks of transform coefficients, calculating filtered transform domain residuals by applying the block of transform domain filter coefficients to at least a portion of the block of prediction transform coefficients associated with that block of transform coefficients.

2. The method claimed in claim 1, wherein the image is part of a video, and wherein the method further comprises performing motion estimation to select the blocks of prediction samples, and wherein blocks of prediction samples are reference blocks of reconstructed pixels from one or more previously encoded frames.

3. The method claimed in claim 1, further comprising performing spatial compensation to select the blocks of prediction samples, and wherein the blocks of prediction samples are reference blocks of samples determined based upon values adjacent the block of samples in the image.

4. The method claimed in claim 1, wherein generating the block of transform domain filter coefficients comprises calculating, for at least some of the coefficient positions in the block, a ratio, a numerator of the ratio including a sum of the product of values in the corresponding position of the blocks of transform coefficients and values in the corresponding position of the blocks of prediction transform coefficients, and a denominator of the ratio including a sum of the square of the values in the corresponding position of the blocks of prediction transform coefficients.

5. The method claimed in claim 1, wherein generating the block of transform domain filter coefficients comprises calculating, for at least some of the coefficient positions in the block, a ratio in accordance with the expression:

$$f_{ij} = \frac{\sum_k c_{x_k,ij} \cdot (c_{p_k,ij} + Q^{-1}(u_{k,ij}))}{\sum_k (c_{p_k,ij} + Q^{-1}(u_{k,ij}))^2}$$

wherein $f_{ij}$ comprises the transform domain filter coefficient for the $ij^{th}$ coefficient position, $c_{x_k,ij}$ comprises the value at the $ij^{th}$ coefficient position in the kth block of transform coefficients, $c_{p_k,ij}$ comprises the value at the $ij^{th}$ coefficient position of the kth block of prediction transform coefficients, $u_{k,ij}$ comprises a $ij^{th}$ quantized transform domain coefficient in the kth block, and $Q^{-1}(\bullet)$ comprises a dequantization function.

6. The method claimed in claim 1, wherein the generating the block of transform domain filter coefficients, f, comprises finding the filter coefficients f that minimize the expression:

$$\Sigma_{k,ij}|c_{x_k,ij} - f_{ij}*(c_{p_k,ij} + Q^{-1}(u_{k,ij}))|^2$$

wherein $c_{x_k,ij}$ comprises the value at the $ij^{th}$ coefficient position in the kth block of transform coefficients, $c_{p_k,ij}$ comprises the value at the $ij^{th}$ coefficient position of the kth block of prediction transform coefficients, $u_{k,ij}$ comprises a $ij^{th}$ quantized transform domain coefficient in the kth block, and $Q^{-1}(\bullet)$ comprises a dequantization function.

7. The method claimed in claim 1, wherein the generating the block of transform domain filter coefficients, f, comprises finding the filter coefficients f that minimize the expression:

$$\Sigma_{k,ij}|c_{x_k,ij} - f_{ij}*c_{p_k,ij}|^2$$

wherein $c_{x_k,ij}$ comprises the value at the $ij^{th}$ coefficient position in the kth block of transform coefficients, and $c_{p_k,ij}$ comprises the value at the $ij^{th}$ coefficient position of the kth block of prediction transform coefficients.

8. The method claimed in claim 1, wherein generating the block of transform domain filter coefficients is performed once per coding unit or frame.

9. The method claimed in claim 1, further comprising entropy encoding at least some of the transform domain filter coefficients within a bitstream, by, for each of the at least some of the transform domain filter coefficients, encoding an index based upon a difference between that transform domain filter coefficient and a prediction.

10. A non-transitory computer-readable medium storing computer-executable instructions which, when executed by a processor, configure the processor to perform the method claimed in claim 1.

11. The method claimed in claim 1, wherein calculating the filtered transform domain residual comprises calculating a filtered prediction by scaling at least a portion of the block of prediction transform coefficients by the filter coefficients, and wherein the filtered transform domain reconstruction comprises the difference between the filtered prediction and the block of transform coefficients.

12. A method of filtering for use in a decoder for reconstructing a block of samples for an image, wherein the decoder has a predictive block of samples associated with the block of samples, the method comprising:
spectrally transforming the predictive block of samples to obtain a transformed prediction block;
calculating a filtered transform domain reconstruction by applying a block of filter coefficients to at least a portion of the transformed prediction block.

13. The method claimed in claim 12, wherein calculating the filtered transform domain reconstruction comprises calculating a filtered prediction by scaling at least a portion of the transformed prediction block by the filter coefficients and dequantizing a block of quantized transform domain coefficients, and wherein the filtered transform domain reconstruction comprises the sum of the filtered prediction and the dequantized block of transform domain coefficients.

14. The method claimed in claim 12, wherein calculating the filtered transform domain reconstruction comprises:
dequantizing a block of quantized transform domain coefficients;
calculating a transform domain reconstruction block as the transformed prediction block plus the dequantized block of transform domain coefficients; and
scaling the transform domain reconstruction block using the filter coefficients.

15. The method claimed in claim 14, wherein scaling comprises element-wise multiplication.

16. The method claimed in claim 12, further comprising extracting the filter coefficients from an input bitstream, wherein extracting comprises entropy decoding the input bitstream to recover the filter coefficients.

17. A method of decoding a bitstream to reconstruct an image, the method comprising:
entropy decoding the bitstream to obtain a block of quantized transform domain coefficients, the filter coefficients, and prediction data;
identifying the predictive block of samples based on the prediction data;
obtaining the filtered transform domain reconstruction using the method claimed in claim 12; and
inverse transforming the filtered transform domain reconstruction to output a block of reconstructed samples.

18. The method claimed in claim 17, wherein the prediction data includes a motion vector, and wherein identifying the predictive block of samples includes performing motion compensation to select a reference block from a reference frame, and wherein spectrally transforming comprises transforming the reference block.

19. A non-transitory computer-readable medium storing computer-executable instructions which, when executed by a processor, configure the processor to perform the method claimed in claim 12.

20. An encoder for calculating filter coefficients for use in encoding an image, the image including blocks of samples, the encoder comprising:
a processor;
a memory storing the blocks of samples; and
an encoding application stored in memory and containing instructions for configuring the processor to
spectrally transform the blocks of samples to obtain blocks of transform coefficients,
for each of the blocks of samples, spectrally transform a block of prediction samples to obtain a block of prediction transform coefficients,
generate a block of transform domain filter coefficients based upon the blocks of transform coefficients and the blocks of prediction transform coefficients, and
for each of the blocks of transform coefficients, calculate filtered transform domain residuals by applying the block of transform domain filter coefficients to at least a portion of the block of prediction transform coefficients associated with that block of transform coefficients.

21. The encoder claimed in claim 20, wherein the image is part of a video, and wherein the processor is further configured to perform motion estimation to select the blocks of prediction samples, and wherein blocks of prediction samples are reference blocks of reconstructed pixels from one or more previously encoded frames.

22. The encoder claimed in claim 20, wherein the processor is further configured to perform spatial compensation to select the blocks of prediction samples, and wherein the blocks of prediction samples are reference blocks of samples determined based upon values adjacent the block of samples in the image.

23. The encoder claimed in claim 20, wherein the processor is further configured to generate the block of transform domain filter coefficients by calculating, for at least some of the coefficient positions in the block, a ratio, a numerator of the ratio including a sum of the product of values in the corresponding position of the blocks of transform coefficients and values in the corresponding position of the blocks of prediction transform coefficients, and a denominator of the ratio including a sum of the square of the values in the corresponding position of the blocks of prediction transform coefficients.

24. The encoder claimed in claim 20, wherein the processor is further configured to generate the block of transform domain filter coefficients by calculating, for at least some of the coefficient positions in the block, a ratio in accordance with the expression:

$$f_{ij} = \frac{\sum_k c_{x_k,ij} \cdot (c_{p_k,ij} + Q^{-1}(u_{k,ij}))}{\sum_k (c_{p_k,ij} + Q^{-1}(u_{k,ij}))^2}$$

wherein $f_{ij}$ comprises the transform domain filter coefficient for the $ij^{th}$ coefficient position, $c_{x_k,ij}$ comprises the value at the $ij^{th}$ coefficient position in the kth block of transform coefficients, $c_{p_k,ij}$ comprises the value at the $ij^{th}$ coefficient position of the kth block of prediction transform coefficients, $u_{k,ij}$ comprises a ij$^{th}$ quantized transform domain coefficient in the kth block, and Q$^{-1}$(•) comprises a dequantization function.

25. The encoder claimed in claim 20, wherein the processor is further configured to generate the block of transform domain filter coefficients by finding the filter coefficients f that minimize the expression:

$$\Sigma_{k,ij}|c_{x_k,ij}-f_{ij}*(c_{p_k,ij}+Q^{-1}(u_{k,ij}))|^2$$

wherein $c_{x_k,ij}$ comprises the value at the ij$^{th}$ coefficient position in the kth block of transform coefficients, $c_{p_k,ij}$ comprises the value at the ij$^{th}$ coefficient position of the kth block of prediction transform coefficients, $u_{k,ij}$ comprises a ij$^{th}$ quantized transform domain coefficient in the kth block, and Q$^{-1}$(•) comprises a dequantization function.

26. The encoder claimed in claim 20, wherein the processor is further configured to generate the block of transform domain filter coefficients by finding the filter coefficients f that minimize the expression:

$$\Sigma_{k,ij}|c_{x_k,ij}-f_{ij}*c_{p_k,ij}|^2$$

wherein $c_{x_k,ij}$ comprises the value at the ij$^{th}$ coefficient position in the kth block of transform coefficients, and $c_{p_k,ij}$ comprises the value at the ij$^{th}$ coefficient position of the kth block of prediction transform coefficients.

27. The encoder claimed in claim 20, wherein the processor is configured to generate the block of transform domain filter coefficients once per coding unit or frame.

28. The encoder claimed in claim 20, wherein the processor is further configured to entropy encoding at least some of the transform domain filter coefficients within a bitstream, by, for each of the at least some of the transform domain filter coefficients, encoding an index based upon a difference between that transform domain filter coefficient and a prediction.

29. The encoder claimed in claim 20, wherein the processor is to calculate the filtered transform domain residual by calculating a filtered prediction by scaling at least a portion of the block of prediction transform coefficients by the filter coefficients, and wherein the filtered transform domain reconstruction comprises the difference between the filtered prediction and the block of transform coefficients.

30. A decoder for filtering during reconstruction of a block of samples for an image, wherein the decoder has a predictive block of samples associated with the block of samples, the decoder comprising:
 a processor;
 a memory; and
 a decoding application stored in memory and containing instructions for configuring the processor to
  spectrally transform the predictive block of samples to obtain a transformed prediction block, and
  calculate a filtered transform domain reconstruction by applying a block of filter coefficients to at least a portion of the transformed prediction block.

31. The decoder claimed in claim 30, wherein the processor is configured to calculate the filtered transform domain reconstruction through calculating a filtered prediction by scaling at least a portion of the transformed prediction block by the filter coefficients and dequantizing a block of quantized transform domain coefficients, and wherein the filtered transform domain reconstruction comprises the sum of the filtered prediction and the dequantized block of transform domain coefficients.

32. The decoder claimed in claim 30, wherein the processor is configured to calculate the filtered transform domain reconstruction by:
 dequantizing a block of quantized transform domain coefficients;
 calculating a transform domain reconstruction block as the transformed prediction block plus the dequantized block of transform domain coefficients; and
 scaling the transform domain reconstruction block using the filter coefficients.

33. The decoder claimed in claim 32, wherein scaling comprises element-wise multiplication.

34. The decoder claimed in claim 30, wherein the processor is further configured to extract the filter coefficients from an input bitstream by entropy decoding the input bitstream to recover the filter coefficients.

35. The decoder claimed in claim 30, wherein the processor is further configured to reconstruct the image by:
 entropy decoding the bitstream to obtain a block of quantized transform domain coefficients, the filter coefficients, and prediction data;
 identifying the predictive block of samples based on the prediction data; and
 inverse transforming the filtered transform domain reconstruction to output a block of reconstructed samples.

36. The decoder claimed in claim 35, wherein the prediction data includes a motion vector, and wherein the processor is configured to identify the predictive block of samples by performing motion compensation to select a reference block from a reference frame, and to spectrally transform by transforming the reference block.

* * * * *